June 30, 1953  M. MERRIAM  2,643,576
THREE-DIMENSIONAL MAP MODEL ACCURACY COMPARATOR
Filed March 30, 1951  3 Sheets-Sheet 3

Patented June 30, 1953

2,643,576

UNITED STATES PATENT OFFICE 2,643,576

THREE-DIMENSIONAL MAP MODEL ACCURACY COMPARATOR

Mylon Merriam, Washington, D. C., assignor to the United States of America as represented by the Secretary of the Army Application March 30, 1951, Serial No. 218,511

4 Claims. (Cl. 88—24)

(Granted under Title 35, U. S. Code (1952), sec. 266)

The invention herein described and claimed may be manufactured and used by or for the Government for Governmental purposes without the payment to me of any royalty thereon.

The present invention concerns a means for determining the accuracy of three dimensional map models, although its use is not limited to this art.

By way of explanation, a three dimensional map model is one wherein there is vertical extent of representations of natural terrain features having vertical extent. This is in contrast to ordinary flat maps, wherein mountains, etc., are depicted by such means as contour lines.

There are numerous known methods of producing such a three dimensional map model. A preferred method is to use a machine known as a contour pantograph. The tracing stylus of this pantograph is caused to move in a groove which is the contour line of an etched zinc contour plate. The follower stylus is in reality a revolving power driven cutter which may be heighth-adjusted to correspond to any given contour line on the contour plate. The follower stylus cuts into a block of laminated plastic sheets. Each sheet represents one contour interval. It will thus be seen that an operator, by causing the tracing stylus to follow in the contour line groove in the etched zinc contour plate, and by setting the follower stylus to a corresponding height as represented by the contour line being traced can produce in the laminated sheet a three dimensional representation of the terrain represented by the contour plate. This will, of course, produce a stepped arrangement on the laminated sheet, which is thereafter filled in with modeling clay so as to represent the terrain as it actually is, rather than by the stepped arrangement. In filling in the stepped contour, unavoidable errors occur.

It is therefore an object of the present invention to provide a novel and efficient means for determining and aiding in the correction of errors in a three dimensional map model.

Another object is to provide a means of observing the accuracy of a three dimensional map model.

Yet another object is to provide a novel means of determining the accuracy of any three dimensional model, with the use of a two dimensional plan thereof which contains indicia of the third dimension.

These objects are all achieved by the use of a simple mechanism producing high fidelity results with the absence of complicated paraphernalia.

Briefly stated, a column of light, the rays of which are all parallel, is passed through a transparent sheet, such as glass, having thereon contour lines which correspond to the contour lines of the subject terrain. This light, and the shadows or silhouettes of the contour lines, then fall upon the three dimensional terrain model which preferably has been formed from a laminated block as above explained. The silhouettes of the contour lines are oriented with the model. An operator may then readily observe and correct any errors in the terrain model.

Figure 1:
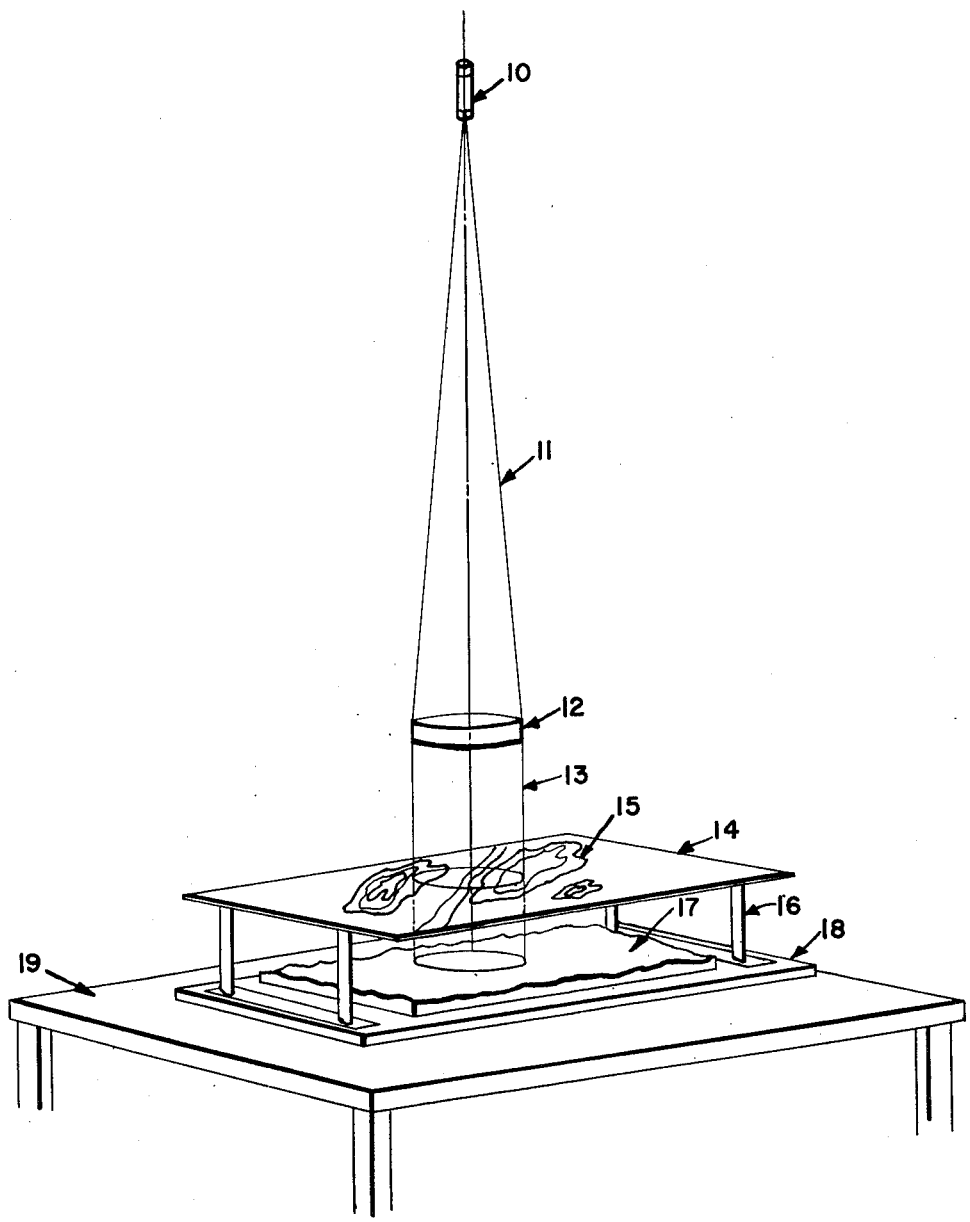
Figure 1 is a schematic view of the shadow projector.

A light source 10 emits a diverging beam of light 11 downwardly. This light passes through a collimating lens 12 which serves to cause the light rays to bend so that they are all parallel. The collimated beam 13 is then passed through glass transparency 14 which has thereon contour lines 15. This transparency is known as a line positive. Transparency 14 is supported by posts 16 in any convenient manner. Below the transparency 14 there is a terrain model 17 which has preferably been produced by the above described method. Of course, the terrain represented by the contour lines on the transparency is the same terrain as is represented by the terrain model 17. The horizontal scale of the transparency is the same as the horizontal scale of the terrain model. It will thus be seen, that when the transparency and model are properly aligned, any errors which have occurred in the production of the terrain model will be readily apparent, due to the non-matching of the shadows of the contour lines with the contours of the model. Correction of the model may then be readily facilitated. The model 17 is placed upon a cradle 18 which is in turn mounted upon a table 19 which table may be levelled and may be moved in relation to the light beam. This allows scanning of the entire model. It may be noted that the use of a shadow system in a collimated beam achieves adequate line resolution; i. e. there is only inconsequential diffraction of the line shadows when the contour plate is within 10 inches of the model.

Figure 2:
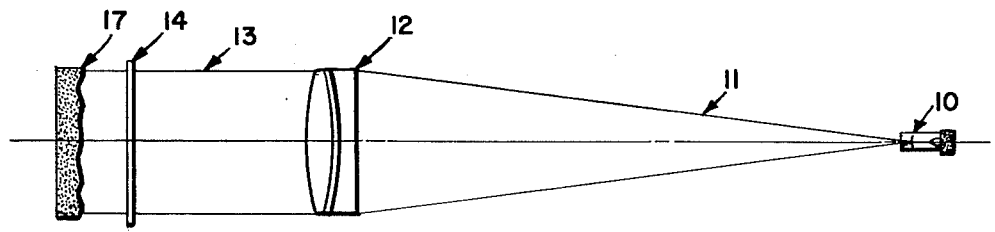
Figure 2 shows the shadow forming system thereof.

Figure 2 illustrates the shadow forming system shown in Figure 1. It may be noted that the collimating lens is of the Fraunhofer type.

Figure 3:
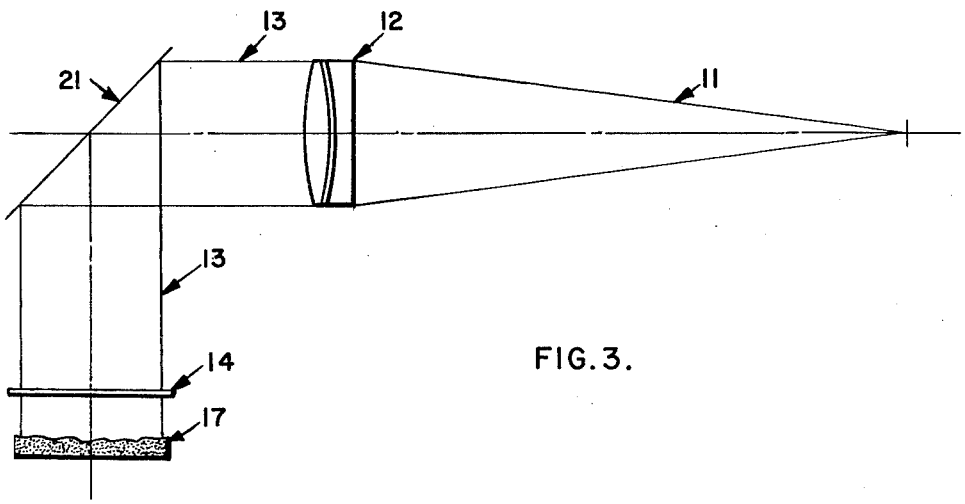
Figure 3 is a modification of the shadow forming system.

The shadow forming system shown in Figure 3 is similar to the shadow forming system of Figures 1 and 2, except that the initial light beam is at right angles to the final light beam. This result is effected by mirror 21 placed at a 45° angle. The advantage of such a system is that it allows the equipment to be contained in a space having a smaller vertical height.

Figure 4:
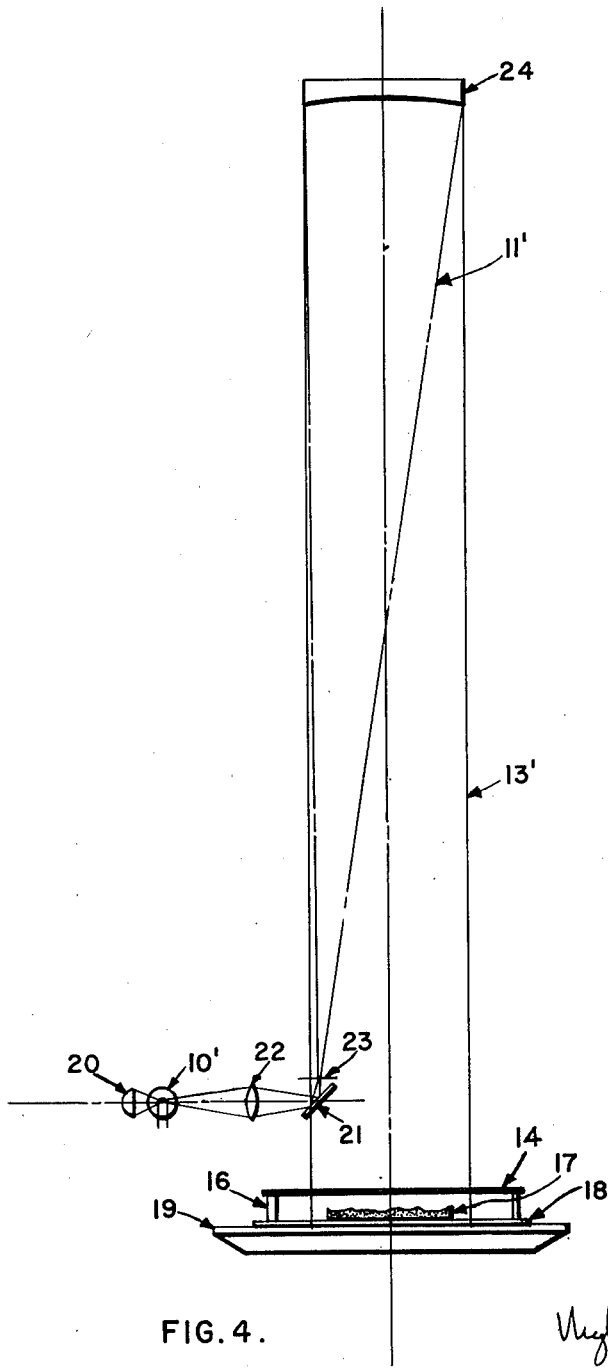
Figure 4 shows a shadow forming system using a parabolic reflector.

Figure 4 shows another shadow forming system.

A filament type light source 10' is used. Behind it is placed a spherical mirror 20 which reflects the image of the filament back onto the filament. This produces a more satisfactory light source. The light is then focused on aperture plate 23, which is in effect a point source of light for the system. Mirror 21 is used to change the direction of the light. Conical beam 11' is collimated by spherical or parabolic mirror 24.

Since parabolic and spherical mirrors are substantially lower in cost than lenses, as a means of obtaining collimated light the advantage of the mirror is obvious. Further, mirrors are readily available which are of about the same diameter as the diagonal of the map model (40"). This means that the entire model may have cast thereon the shadow of the entire contour plate when a mirror is used. This, of course, eliminates scanning, which is necessary with the available lenses. One advantage achieved by the elimination of scanning is that the entire model is seen at once, so that any small area errors which are present are seen in true relation to the entire area. Another advantage is that where a large area is illuminated the operator's fatigue is greatly reduced.

It will be readily understood that the knowledge that the line shadows cast by and in a collimated light beam may be effectively prevented from deteriorating has other applications. For example, in the printing of flat maps, there may occur an elongation of the paper in the presses. This will, of course, cause the map data printed on the paper to not be true. Otherwise stated, due to elongation of the paper, part of the data printed thereon will not be in true relationship to the remaining data. Any error thus arising may be observed by passing a collimated beam through the original printing plate, if transparent, and orienting the shadows of the data on the printing plate with the printed matter on the map. The word "below," as used herein, is not intended to limit the positioning of the device as a whole, but is only used to indicate the relative position of the parts.

While I have disclosed the preferred embodiments of my invention, it is to be understood that minor changes thereto may be resorted to without departing from the spirit of the invention and the scope of the appended claims.

What I claim as new is:

1. A three dimensional map model accuracy comparator comprising a light source, said source emitting a conical beam of light, collimating lens means positioned to intercept said conical light beam with the axis thereof directed toward the light source, to thereby change said beam to a collimated beam, a transparent sheet positioned in the path of and substantially at right angles to said collimated light beam, said transparent sheet having thereon contour lines respresenting a certain selected terrain, and a three dimensional terrain model positioned below said sheet and in the path of said light beam, with its datum plane substantially parallel to the transparent sheet and substantially at right angles to the light beam, said model representing the same terrain as the contour lines on the transparent sheet, terrain features represented on the sheet and corresponding terrain features represented on the model respectively lying on lines substantially perpendicular to the sheet and to the datum plane of the model, whereby shadows of said contour lines and terrain features on said sheet are projected upon corresponding terrain features of said model for viewing.

2. A three dimensional map model comparator comprising means to produce a collimated beam of light, a transparent sheet positioned in the path of the collimated light, said sheet having thereon contour lines representing to scale a certain terrain, a three dimensional map model representing the same terrain and being to the same scale as the sheet placed in the light beam below the transparent contour line sheet, the datum plane of the model and the sheet being substantially parallel to each other and substantially perpendicular to the collimated light beam, terrain features represented on the sheet and corresponding terrain features represented on the model respectively lying on lines substantially perpendicular to the sheet and to the datum plane of the model, whereby shadows of said contour lines and terrain features on said sheet are projected upon corresponding terrain features of said model for viewing.

3. A three dimensional map model accuracy comparator comprising a light source, said source emitting a conical beam of light, collimating lens means positioned to intercept said conical light beam with the axis thereof directed toward the light source, to thereby change said beam to a collimated beam, a transparent sheet positioned in the path of and substantially at right angles to said collimated light beam, said transparent sheet having thereon contour lines representing a certain selected terrain, and a three dimensional terrain model positioned below said sheet and in the path of said light beam, with its datum plane substantially parallel to the transparent sheet and substantially at right angles to the light beam, said model representing the same terrain as the contour lines on the transparent sheet to the same scale, terrain features represented on the sheet and corresponding terrain features represented on the model respectively lying on lines substantially perpendicular to the sheet and to the datum plane of the model, whereby shadows of said contour lines and terrain features on said sheet are projected upon corresponding terrain features of said model for viewing.

4. Means to determine the accuracy of a three dimensional map model comprising a substantially point source of light, a concave reflector collimating means in the light beam emanating from said source of light, said collimating means being positioned so that the beam of light reflected therefrom is collimated, a transparent sheet having contour lines thereon representing to scale a given terrain, a three dimensional map model of the same terrain as the sheet and to the same scale positioned in the light beam below the transparent sheet, the sheet and the datum plane of the model being substantially parallel to each other and substantially perpendicular to the beam of light from the collimating means, said transparent sheet and said model being oriented so that shadows of contour lines on said sheet are projected upon corresponding terrain feature representations on said model, the diameter of the beam of light from the collimating means being substantially as large as the largest transverse dimension of the transparency and model.

MYLON MERRIAM.

References Cited in the file of this patent

UNITED STATES PATENTS

| Number | Name | Date |
|---|---|---|
| 1,565,413 | Brock et al. | Dec. 15, 1925 |
| 1,801,200 | Howell | Apr. 14, 1931 |
| 1,963,128 | Geister | June 19, 1934 |
| 1,997,712 | Bauer | Apr. 16, 1935 |
| 2,072,286 | Wellington | Mar. 2, 1937 |
| 2,200,594 | Diggins et al. | May 14, 1940 |
| 2,374,981 | Cooke | May 1, 1945 |
| 2,420,316 | Hine | May 13, 1947 |
| 2,448,568 | Zwillinger et al. | Sept. 7, 1948 |
| 2,464,794 | Cooke | Mar. 22, 1949 |
| 2,466,161 | Doll | Apr. 5, 1949 |

FOREIGN PATENTS

| Number | Country | Date |
|---|---|---|
| 254,301 | Great Britain | Jan. 6, 1927 |